United States Patent

Schaffer

Patent Number: 5,984,549
Date of Patent: Nov. 16, 1999

[54] MULTIPLE KEY DEPRESSING DEVICE

[76] Inventor: David J. Schaffer, 2424 24th St., Greeley, Colo. 80631

[21] Appl. No.: 09/199,356

[22] Filed: Nov. 25, 1998

[51] Int. Cl.[6] .................................................. B41J 29/00
[52] U.S. Cl. ........................................... 400/679; 400/472
[58] Field of Search ..................................... 400/679, 719, 400/472, 477; 341/22, 21; 235/145 R, 145 A, 146; 361/680

[56] References Cited

U.S. PATENT DOCUMENTS

| | | | |
|---|---|---|---|
| 3,950,634 | 4/1976 | Speiser | 235/145 R |
| 4,493,219 | 1/1985 | Sharp et al. | 73/862.05 |
| 4,825,019 | 4/1989 | Fisher | 200/6 A |
| 5,034,574 | 7/1991 | Martovitz | 200/6 A |

Primary Examiner—Edgar Burr
Assistant Examiner—Anthony H. Nguyen

[57] ABSTRACT

A multiple key depressing device for depressing several spaced apart keys on a keyboard of a computer with one hand. The multiple key depressing device includes a support rod with opposite first and second ends, and a pair of spaced apart bends defining first, second, and third elongate portions. A handle designed for grasping by a hand of a user is upwardly extended from the support rod. A plurality of elongate legs downwardly depend from the support rod. Each leg has a lower end adapted for resting on a key of a keyboard of a computer.

16 Claims, 2 Drawing Sheets

MULTIPLE KEY DEPRESSING DEVICE

BACKGROUND OF THE INVENTION

1. Field of the Invention

The present invention relates to keyboard accessories for computers and more particularly pertains to a new multiple key depressing device for depressing several spaced apart keys on a keyboard of a computer with one hand.

2. Description of the Prior Art

The use of keyboard accessories for computers is known in the prior art. More specifically, keyboard accessories for computers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,560,845; U.S. Pat. No. 4,440,515; U.S. Pat. No. 4,851,618; U.S. Pat. No. 5,574,446; U.S. Pat. No. 5,034,573; and U.S. Pat. No. Des. 311,524.

While these devices fulfill their respective, particular objectives and requirements, the aforementioned patents do not disclose a new multiple key depressing device. The inventive device includes a support rod with opposite first and second ends, and a pair of spaced apart bends defining first, second, and third elongate portions. A handle designed for grasping by a hand of a user is upwardly extended from the support rod. A plurality of elongate legs downwardly depend from the support rod. Each leg has a lower end adapted for resting on a key of a keyboard of a computer.

In these respects, the multiple key depressing device according to the present invention substantially departs from the conventional concepts and designs of the prior art, and in so doing provides an apparatus primarily developed for the purpose of depressing several spaced apart keys on a keyboard of a computer with one hand.

SUMMARY OF THE INVENTION

In view of the foregoing disadvantages inherent in the known types of keyboard accessories for computers now present in the prior art, the present invention provides a new multiple key depressing device construction wherein the same can be utilized for depressing several spaced apart keys on a keyboard of a computer with one hand.

The general purpose of the present invention, which will be described subsequently in greater detail, is to provide a new multiple key depressing device apparatus and method which has many of the advantages of the keyboard accessories for computers mentioned heretofore and many novel features that result in a new multiple key depressing device which is not anticipated, rendered obvious, suggested, or even implied by any of the prior art keyboard accessories for computers, either alone or in any combination thereof.

To attain this, the present invention generally comprises a support rod with opposite first and second ends, and a pair of spaced apart bends defining first, second, and third elongate portions. A handle designed for grasping by a hand of a user is upwardly extended from the support rod. A plurality of elongate legs downwardly depend from the support rod. Each leg has a lower end adapted for resting on a key of a keyboard of a computer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multiple key depressing device apparatus and method which has many of the advantages of the keyboard accessories for computers mentioned heretofore and many novel features that result in a new multiple key depressing device which is not anticipated, rendered obvious, suggested, or even implied by any of the prior art keyboard accessories for computers, either alone or in any combination thereof.

It is another object of the present invention to provide a new multiple key depressing device which may be easily and efficiently manufactured and marketed.

It is a further object of the present invention to provide a new multiple key depressing device which is of a durable and reliable construction.

An even further object of the present invention is to provide a new multiple key depressing device which is susceptible of a low cost of manufacture with regard to both materials and labor, and which accordingly is then susceptible of low prices of sale to the consuming public, thereby making such multiple key depressing device economically available to the buying public.

Still yet another object of the present invention is to provide a new multiple key depressing device which provides in the apparatuses and methods of the prior art some of the advantages thereof, while simultaneously overcoming some of the disadvantages normally associated therewith.

Still another object of the present invention is to provide a new multiple key depressing device for depressing several spaced apart keys on a keyboard of a computer with one hand.

Yet another object of the present invention is to provide a new multiple key depressing device which includes a support rod with opposite first and second ends, and a pair of spaced apart bends defining first, second, and third elongate portions. A handle designed for grasping by a hand of a user is upwardly extended from the support rod. A plurality of elongate legs downwardly depend from the support rod. Each leg has a lower end adapted for resting on a key of a keyboard of a computer.

Still yet another object of the present invention is to provide a new multiple key depressing device that may be configured to permit a user to simultaneously depress the "Option", "Command", "R", and "P" keys of an Macintosh-type of personal computer to reset the parameter RAM of the personal computer to the factory default settings with one hand.

Even still another object of the present invention is to provide a new multiple key depressing device that may be configured to permit a user to simultaneously depress the "Ctrl", "Alt", and "Delete", keys of an IBM compatible-type of personal computer to restart the computer with one hand.

These together with other objects of the invention, along with the various features of novelty which characterize the invention, are pointed out with particularity in the claims annexed to and -forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
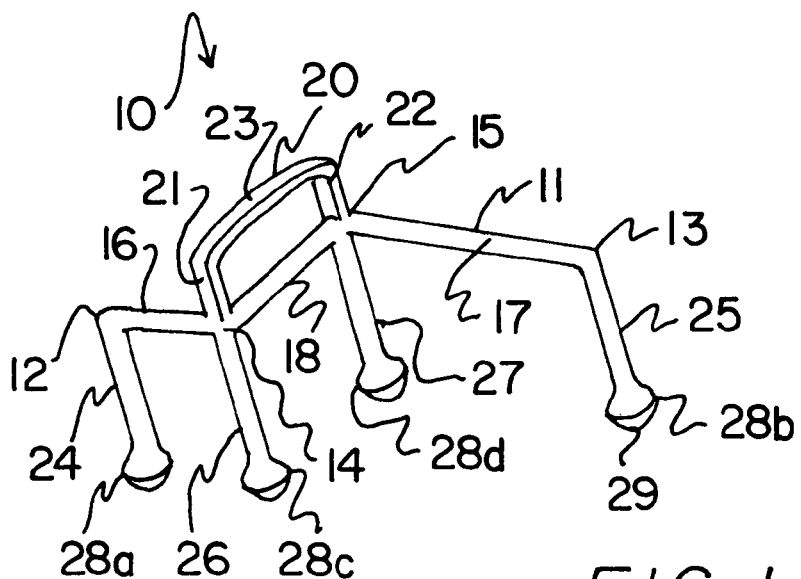
FIG. 1 is a schematic perspective view of a new multiple key depressing device for use with a Mackintosh-type personal computer according to the present invention.

With reference now to the drawings, and in particular to FIGS. 1 through 5 thereof, a new multiple key depressing device embodying the principles and concepts of the present invention and generally designated by the reference numeral 10 will be described..

As best illustrated in FIGS. 1 through 5, the multiple key depressing device 10 generally comprises a support rod 11 with opposite first and second ends 12,13, and a pair of spaced apart bends defining first, second, and third elongate portions 16,17,18. A handle 20 designed for grasping by a hand of a user is upwardly extended from the support rod 11. A plurality of elongate legs 24,25,26,27 downwardly depend from the support rod 11. Each leg 24,25,26,27 has a lower end adapted for resting on a key of a keyboard 1 of a computer.

The multiple key depressing device 10 is designed for depressing multiple spaced apart keys on a keyboard 1 of a computer. In closer detail, the support rod 11 has opposite first and second ends 12,13, and a pair of spaced apart bends 14,15 defining first, second, and third elongate portions 16,17,18. The first elongate portion 16 of the support rod 11 is positioned adjacent the first end 12 of the support rod 11. The second elongate portion 17 of the support rod 11 is positioned adjacent the ax second end 13 of the support rod 11. The third elongate portion 18 of the support rod 11 is interposed between the first and second elongate portions 16,17 of the support rod 11. A first of the bends 14 of the support rod 11 is located between the first and third elongate portions 16,18 of the support rod 11. A second of the bends 15 of the support rod 11 is located between the second and third elongate portions 17,18 of the support rod 11.

The first elongate portion 16 has a length defined between the first end 12 and the first bend 14 of the support rod 11. The second elongate portion 17 has a length defined between the second end 13 and the second bend 15 of the support rod 11. The third elongate portion 18 has a length defined between the first and second bends 14,15 of the support rod 11. The length of the second elongate portion 17 is greater than the length of the third elongate portion 18 and the length of the third elongate portion 18 is greater than the length of the first elongate portion 16.

The first, second, and third elongate portions 16,17,18 of the support rod 11 each have a longitudinal axis and preferably a generally circular transverse cross section taken generally perpendicular to the longitudinal axis of the respective elongate portion of the support rod 11. The transverse cross sections of the each of the elongate portions 16,17,18 of the support rod 11 has a diameter. The diameters of the transverse cross sections of the elongate portions of the support rod 11 are preferably generally equal to one another. Ideally, the diameters of the transverse cross sections of the elongate portions are each about 1 inch. Preferably, the longitudinal axes of the first, second, and third elongate portions 16,17,18 of the support rod 11 generally lie in a generally common horizontal plane. The longitudinal axes of the first and third elongate portions 16,18 of the support rod 11 are extended at a first obtuse angle at the first bend 14 with respect to each other. The longitudinal axes of the second and third elongate portions 17,18 of the support rod 11 is extended at a second obtuse angle at the second bend 15 with respect to each other. The second obtuse angle is greater than the first obtuse angle.

The handle 20 designed for grasping by a hand of a user is upwardly extended from the support rod 11. The handle 20 is a generally inverted U-shape and has a pair of spaced apart arms 21,22 and a crossbar 23 connecting upper ends of the arms 21,22 of the handle 20 together. Each of the arms 21,22 of the handle 20 has a lower end coupled to the support rod 21,22. The lower end of a first of the arms 21 of the handle 20 is coupled to the support rod 11 at the first bend 14. The lower end of a second of the arms 22 of the handle 20 is coupled to the support rod 11 at the second bend 15.

A plurality of elongate legs 24,25,26,27 downwardly depend from the support rod 11. Each of the legs has opposite top and bottom ends, and longitudinal axis extending between the top and bottom ends of the respective leg. Each of the legs has a length defined between the top and bottom ends of the respective leg. Preferably, the lengths of the legs are about equal to one another. The longitudinal axes of the legs are preferably extended generally vertically perpendicular to the common plane of the longitudinal axes of the elongate portions of the support rod 11. The upper end of a first of the legs 24 is coupled to the support rod 11 at the first end 12 of the support rod 11. The upper end of a second of the legs 25 is coupled to the support rod 11 at the second end 13 of the support rod 11. The upper end of a third of the legs 27 is coupled to the support rod 11 at the first bend 14 of the support rod 11. In the preferred embodiment illustrated in FIG. 1 for Mackintosh-type personal computers, the upper end of a fourth of the legs 27 is coupled to the support rod 11 at the second bend 15 of the support rod 11.

The lower ends of the legs each terminating at a generally spherical bulbous tip 28a,28b,28c,28d designed for resting on a single key of a keyboard 1 of a computer. Each of the bulbous tips 28a,28b,28c,28d has resiliently deformable lower portion 29 designed for helping prevent slipping of the bulbous tip 28 off of the key of the keyboard 1 the bulbous tip 28 is resting on and also for preventing scratching of the keys by the lower ends of the legs.

The lower portions 29 each ideally comprise a resiliently compressible rubber material.

With reference to FIG. 1, the bulbous tip 28a of the first leg 24 is configured for positioning on a "Opt" key of a keyboard 1 of a Mackintosh-type personal computer, the bulbous tip 28b of the second leg 25 is configured for positioning on a "P" key of a keyboard 1 of a Mackintosh-type personal computer, the bulbous tip 28c of the third leg 26 is configured for positioning on a "Command" key of a keyboard 1 of a Mackintosh-type personal computer, and the bulbous tip 28d of the fourth leg 27 is configured for positioning on a "R" key of a keyboard 1 of a Mackintosh-type personal computer.

Figure 2:
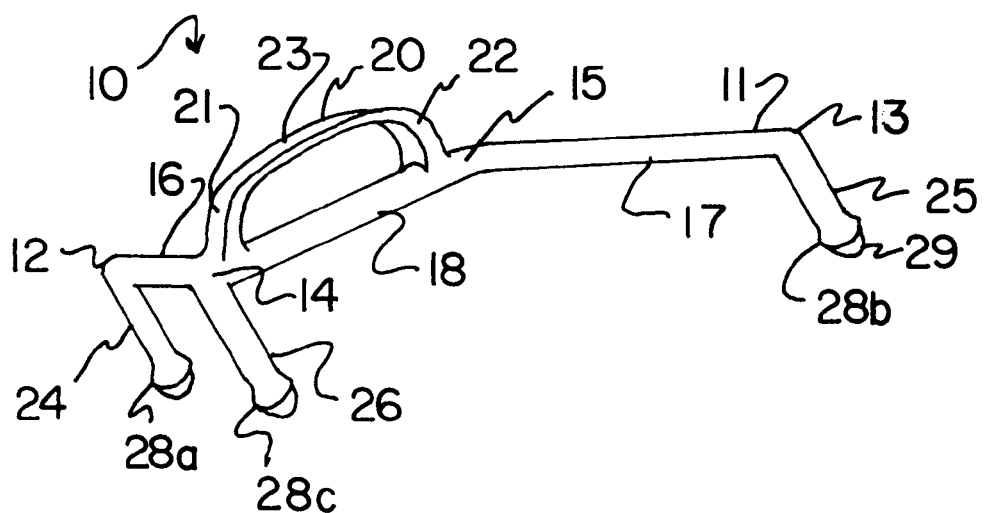
FIG. 2 is a schematic perspective view of an embodiment of the present invention for use with an IBM compatible-type of personal computer.
Figure 3:
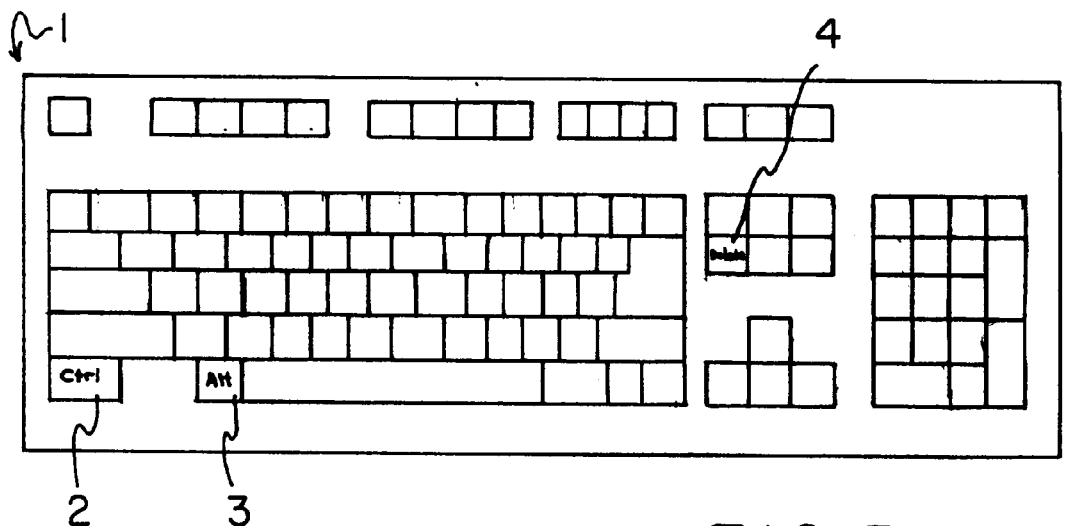
FIG. 3 is a schematic top plan view of a keyboard of an IBM compatible-type of personal computer for use with the embodiment of the present invention of FIG. 2.
Figure 4:
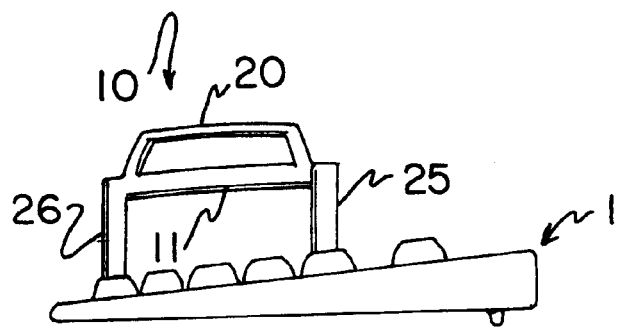
FIG. 4 is a schematic side view of the embodiment of the present invention in use on a keyboard of a Mackintosh-type personal computer.
Figure 5:
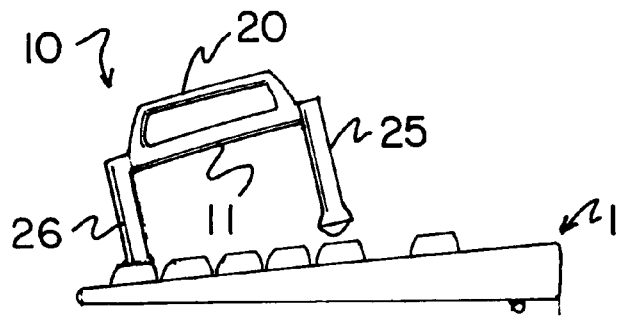
FIG. 5 is a schematic side view of the embodiment of the present invention in use on a keyboard of a Mackintosh-type personal computer with the second leg pivoted off of the third key of the keyboard.

With reference to FIG. 2, the bulbous tip 28a of the first leg 24 is configured for positioning on a "Ctrl" key of a keyboard 1 of a IBM compatible-type personal computer, the bulbous tip 28b of the second leg 25 is configured for positioning on a "Delete" key of a keyboard 1 of a IBM compatible-type personal computer, and the bulbous tip 28c of the third leg 26 is configured for positioning on a "Alt" key of a keyboard 1 of a IBM compatible-type personal computer.

In use, the device 10 is used for depressing multiple keys of a keyboard 1 of a computer generally simultaneously by first grasping said handle 20 with a hand and then placing said bulbous tips 28a,28c of the first and third legs 24,26 on first and second keys of a keyboard 1. Next, the support rod is pivoted with the hand to place said bulbous tip 28b of said second leg 25 on a third key of the keyboard 1. Then the user applies force on the handle 20 with the hand to depress the first, second, and third keys with said bulbous tips 28a,b,c of said first, second, and third legs 24,25,26 generally simultaneously. The same steps are followed with the four leg embodiment with the bulbous tip 28d of the fourth leg 27 placed on a fourth key.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multiple key depressing device for depressing multiple spaced apart keys on a keyboard of a computer, said device comprising:

a support rod having opposite first and second ends, and a pair of spaced apart bends defining first, second, and third elongate portions;

said first elongate portion of said support rod being positioned adjacent said first end of said support rod;

said second elongate portion of said support rod being positioned adjacent said second end of said support rod;

said third elongate portion of said support rod being interposed between said first and second elongate portions of said support rod;

a first of said bends of said support rod being located between said first and third elongate portions of said support rod, a second of said bends of said support rod being located between said second and third elongate portions of said support rod;

said first, second, and third elongate portions of said support rod each having a longitudinal axis;

a handle adapted for grasping by a hand of a user being upwardly extended from said support rod;

a plurality of elongate legs downwardly depending from said support rod, each of said legs having opposite top and bottom ends, and longitudinal axis extending between said top and bottom ends of the respective leg;

the upper end of a first of said legs being coupled to said support rod at said first end of said support rod;

the upper end of a second of said legs being coupled to said support rod at said second end of said support rod; and the upper end of a third of said legs being coupled to said support rod at said first bend of said support rod.

2. The device of claim 1, wherein said first elongate portion has a length defined between said first end and said first bend of said support rod, said second elongate portion has a length defined between said second end and said second bend of said support rod, said third elongate portion has a length defined between said first and second bends of said support rod, wherein said length of said second elongate portion is greater than said length of said third elongate portion, and said length of said third elongate portion is greater than said length of said first elongate portion.

3. The device of claim 1, wherein said longitudinal axes of said first, second, and third elongate portions of said support rod generally lie in a generally common plane.

4. The device of claim 1, wherein said longitudinal axes of said first and third elongate portions of said support rod are extended at a first obtuse angle, said longitudinal axes of said second and third elongate portions of said support rod are extended at a second obtuse angle, and said second obtuse angle being greater than said first obtuse angle.

5. The device of claim 1, wherein said handle is a generally inverted U-shape and has a pair of spaced apart arms and a crossbar connecting upper ends of said arms of said handle together, wherein each of said arms of said handle has a lower end coupled to said support rod.

6. The device of claim 5, wherein said lower end of a first of said arms of said handle is coupled to said support rod at said first bend, and said lower end of a second of said arms of said handle is coupled to said support rod at said second bend.

7. The device of claim 1, wherein each of said legs has a length defined between said top and bottom ends of the respective leg, wherein said lengths of said legs are about equal to one another.

8. The device of claim 1, wherein said longitudinal axes of said legs are extended generally perpendicular to said common plane of said longitudinal axes of said elongate portions of said support rod.

9. The device of claim 1, wherein the upper end of a fourth of said legs is coupled to said support rod at said second bend of said support rod.

10. The device of claim 9, wherein said lower ends of said legs each terminate at a generally spherical bulbous tip adapted for resting on a key of a keyboard of a computer, wherein said bulbous tip of said first leg is configured for positioning on a "Opt" key of a keyboard of a Mackintosh-type personal computer, said bulbous tip of said second leg is configured for positioning on a "P" key of a keyboard of a Mackintosh-type personal computer, said bulbous tip of said third leg is configured for positioning on a "Command" key of a keyboard of a Mackintosh-type personal computer, and said bulbous tip of said fourth leg is configured for positioning on a "R" key of a keyboard of a Mackintosh-type personal computer.

11. The device of claim 1, wherein said lower ends of said legs each terminate at a generally spherical bulbous tip adapted for resting on a key of a keyboard of a computer, and each of said bulbous tips has resiliently deformable lower portion.

12. The device of claim 11, wherein said bulbous tip of said first leg is configured for positioning on a "Ctrl" key of a keyboard of a IBM compatible-type personal computer, said bulbous tip of said second leg is configured for positioning on a "Delete" key of a keyboard of a IBM compatible-type personal computer, and said bulbous tip of said third leg is configured for positioning on a "Alt" key of a keyboard of a IBM compatible-type personal computer.

13. A multiple key depressing device for depressing multiple spaced apart keys on a keyboard of a computer, said device comprising:

a support rod having opposite first and second ends, and a pair of spaced apart bends defining first, second, and third elongate portions;

said first elongate portion of said support rod being positioned adjacent said first end of said support rod;

said second elongate portion of said support rod being positioned adjacent said second end of said support rod;

said third elongate portion of said support rod being interposed between said first and second elongate portions of said support rod;

a first of said bends of said support rod being located between said first and third elongate portions of said support rod, a second of said bends of said support rod being located between said second and third elongate portions of said support rod;

said first elongate portion having a length defined between said first end and said first bend of said support rod, said second elongate portion having a length defined between said second end and said second bend of said support rod, said third elongate portion having a length defined between said first and second bends of said support rod;

said length of said second elongate portion being greater than said length of said third elongate portion, said length of said third elongate portion being greater than said length of said first elongate portion;

said first, second, and third elongate portions of said support rod each having a longitudinal axis and a generally circular transverse cross section taken generally perpendicular to the longitudinal axis of the respective elongate portion of said support rod;

said transverse cross sections of said each of said elongate portions of said support rod having a diameter, said diameters of said transverse cross sections of said elongate portions of said support rod being generally equal to one another, wherein said diameters of said transverse cross sections of said elongate portions are each about 1 inch;

said longitudinal axes of said first, second, and third elongate portions of said support rod generally lying in a generally common plane;

said longitudinal axes of said first and third elongate portions of said support rod being extended at a first obtuse angle;

said longitudinal axes of said second and third elongate portions of said support rod being extended at a second obtuse angle;

said second obtuse angle being greater than said first obtuse angle;

a handle adapted for grasping by a hand of a user being upwardly extended from said support rod, said handle being a generally inverted U-shape and having a pair of spaced apart arms and a crossbar connecting upper ends of said arms of said handle together;

each of said arms of said handle having a lower end coupled to said support rod, said lower end of a first of said arms of said handle being coupled to said support rod at said first bend, said lower end of a second of said arms of said handle being coupled to said support rod at said second bend;

a plurality of elongate legs downwardly depending from said support rod, each of said legs having opposite top and bottom ends, and longitudinal axis extending between said top and bottom ends of the respective leg;

each of said legs having a length defined between said top and bottom ends of the respective leg, wherein said lengths of said legs are about equal to one another;

said longitudinal axes of said legs being extended generally perpendicular to said common plane of said longitudinal axes of said elongate portions of said support rod;

the upper end of a first of said legs being coupled to said support rod at said first end of said support rod;

the upper end of a second of said legs being coupled to said support rod at said second end of said support rod;

the upper end of a third of said legs being coupled to said support rod at said first bend of said support rod;

said lower ends of said legs each terminating at a generally spherical bulbous tip adapted for resting on a key of a keyboard of a computer; and each of said bulbous tips having resiliently deformable lower portion, said lower portion comprising a resiliently compressible rubber material.

14. The device of claim 13, wherein said bulbous tip of said first leg is configured for positioning on a "Opt" key of a keyboard of a Mackintosh-type personal computer, said bulbous tip of said second leg is configured for positioning on a "P" key of a keyboard of a Mackintosh-type personal computer, said bulbous tip of said third leg is configured for positioning on a "Command" key of a keyboard of a Mackintosh-type personal computer, and said bulbous tip of said fourth leg is configured for positioning on a "R" key of a keyboard of a Mackintosh-type personal computer.

15. The device of claim 13, wherein the upper end of a fourth of said legs is coupled to said support rod at said second bend of said support rod, wherein said bulbous tip of said first leg is configured for positioning on a "Ctrl" key of a keyboard of a IBM compatible-type personal computer, said bulbous tip of said second leg is configured for positioning on a "Delete" key of a keyboard of a IBM compatible-type personal computer, and said bulbous tip of said third leg is configured for positioning on a "Alt" key of a keyboard of a IBM compatible-type personal computer.

16. A method for depressing multiple keys of a keyboard of a computer generally simultaneously, comprising the steps of:

providing a multiple key depressing device, comprising:

a support rod having opposite first and second ends, and a pair of spaced apart bends defining first, second, and third elongate portions;

said first elongate portion of said support rod being positioned adjacent said first end of said support rod;

said second elongate portion of said support rod being positioned adjacent said second end of said support rod;

said third elongate portion of said support rod being interposed between said first and second elongate portions of said support rod;

a first of said bends of said support rod being located between said first and third elongate portions of said support rod, a second of said bends of said support rod being located between said second and third elongate portions of said support rod;

said first, second, and third elongate portions of said support rod each having a longitudinal axis;

a handle adapted for grasping by a hand of a user being upwardly extended from said support rod;

a plurality of elongate legs downwardly depending from said support rod, each of said legs having opposite top and bottom ends, and longitudinal axis extending between said top and bottom ends of the respective leg;

the upper end of a first of said legs being coupled to said support rod at said first end of said support rod;

the upper end of a second of said legs being coupled to said support rod at said second end of said support rod; and the upper end of a third of said legs being coupled to said support rod at said first bend of said support rod;

grasping said handle with a hand;

placing said bulbous tips of said first and third legs on first and second keys of a keyboard;

pivoting said support rod with the hand to place said bulbous tip of said second leg on a third key of the keyboard; and applying force on said handle with the hand to depress the first, second, and third keys with said bulbous tips of said first, second, and third legs.

\* \* \* \* \*